March 26, 1957    A. E. DEMBOSKY    2,786,224
HEATING ATTACHMENT FOR WINDSHIELD WIPERS
Filed June 15, 1953
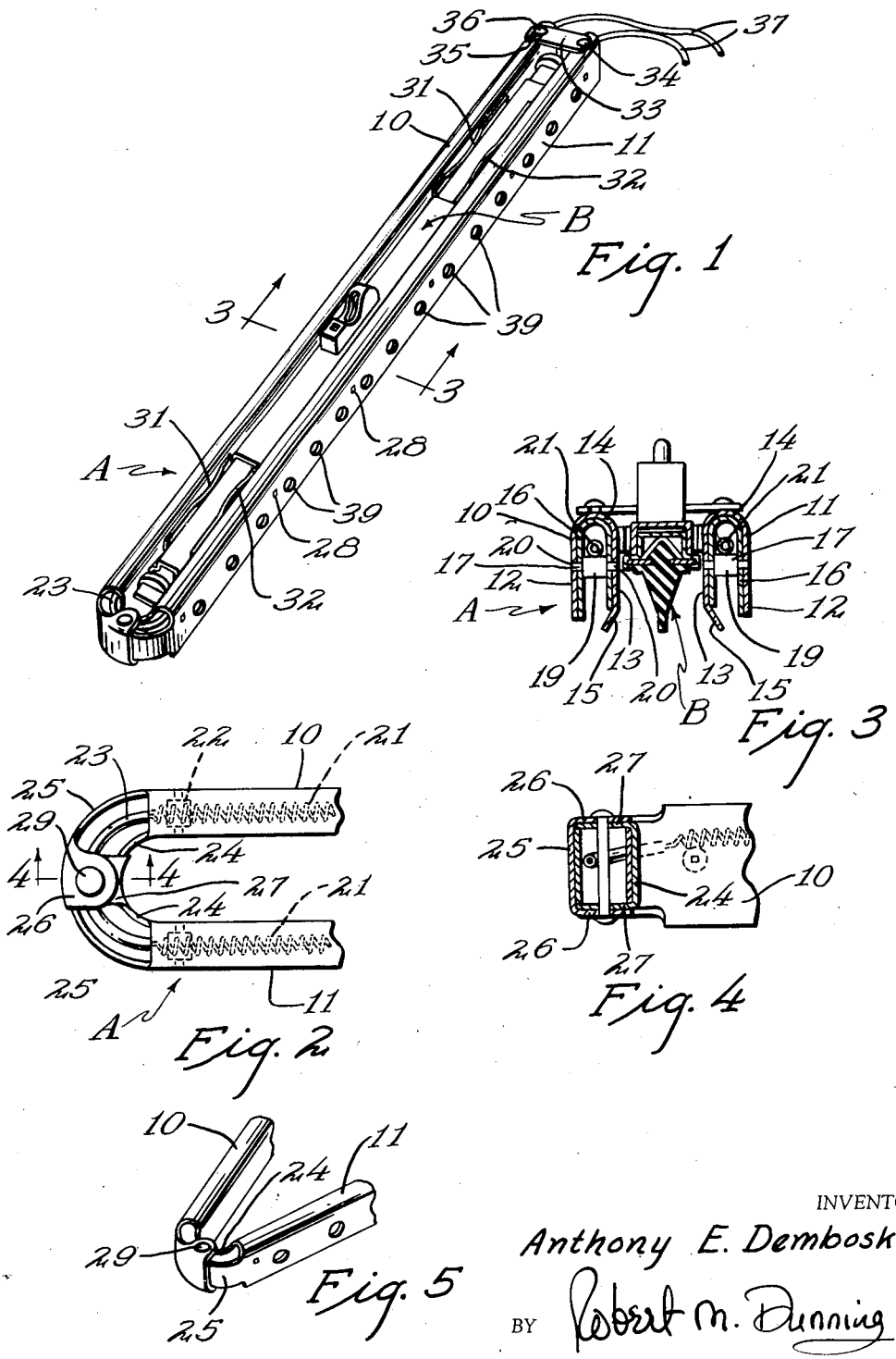
INVENTOR
Anthony E. Dembosky
BY Robert M. Dunning
ATTORNEY 2,786,224
Patented Mar. 26, 1957

2,786,224
HEATING ATTACHMENT FOR WINDSHIELD WIPERS

Anthony E. Dembosky, St. Paul, Minn.

Application June 15, 1953, Serial No. 361,629

6 Claims. (Cl. 15—250.5)

This invention relates to an improvement in windshield wiper attachments and deals particularly with a heater designed for use in combination with the windshield wiper of an automobile or the like.

In portions of the country where below freezing temperatures are likely to be encountered, difficulty is experienced in preventing rain or melted snow from freezing upon the windshield of an automobile or truck. From time to time this situation exists and the ordinary windshield wiper will not clear the outer surface of the windshield of the freezing liquid. Various devices have been provided for heating the windshield in order to overcome this difficulty. The present invention resides in a device capable of heating areas of the windshield as the windshield wiper oscillates, thereby preventing the previous difficulty.

An object of the present invention resides in the provision of a windshield wiper attachment which acts to direct heat toward the surface of the windshield and to thereby melt ice which may form thereon. The device is so designed as to fit onto a windshield wiper of usual design and to move with the windshield wiper over the surface of the windshield.

A feature of the present invention resides in the provision of an enclosure designed to extend on each side of the windshield wiper blade. This enclosure is open on the side thereof next adjacent to the surface of the windshield. The heater element extends through the enclosure and is designed to direct heated air toward the windshield.

A feature of the present invention resides in the provision of a windshield wiper attachment including two enclosure portions which are hingedly connected at one end and which engage on opposite sides of the windshield wiper blade. Resilient means are provided for holding the device in proper relation to the blade.

An added feature of the present invention resides in the provision of a pair of channel shaped enclosures arranged with the open side of the channel directed toward the windshield. These enclosures are provided with a layer of insulation on their inner surfaces which insulate the enclosures from heat and from the electric current passing through the heating elements which are enclosed. One edge of each of the channel shaped enclosures is bent to direct heat away from the windshield wiper blade to prevent overheating of the same.

An added feature of the present invention resides in the provision of a pair of enclosures which are hingedly connected together and which contain heating elements. The two enclosures may be pivoted into parallel relationship to enclose a windshield wiper blade therebetween.

An additional feature of the present invention resides in the provision of openings in the outer surfaces of the enclosure which permits heat to be directed toward the portion of the windshield on the outer sides of the enclosure. These openings prevent excessive heat from being generated within the enclosures and assist in heating the windshield areas on each side of the device.

These and other objects and novel features of the present invention will be more clearly and fully set forth in the following specification and claims.

In the drawings forming a part of the specification:

Figure 1 is a perspective view of the windshield wiper attachment embracing the windshield wiper blade.

Figure 2 is a plan view of one end of the device showing the hinge connection between opposite sides of the enclosure.

Figure 3 is a sectional view through the attachment, the position of the section being indicated by the line 3—3 of Figure 1.

Figure 4 is a sectional view through the hinge joint, the position of the section being indicated by the line 4—4 of Figure 2.

Figure 5 is a perspective view of an end portion of the attachment in open position.

The windshield wiper attachement is indicated in general by the letter A and is oscillated by means of its attachment to a windshield wiper blade B of any suitable design. While certain modifications may be made to fit windshield wipers of various constructions the device illustrated is typical of the construction employed.

The attachment A includes two elongated enclosures 10 and 11 which are hingedly connected at one end. The enclosures 10 and 11 are similar in form but are reversed in position so as to hingedly fit together. Each enclosure includes a generally channel-shaped body having generally parallel sides 12 and 13, which are connected by a rounded base portion 14. The open side of each channel-shaped enclosure is directed toward the windshield and the rounded base portion is most remote therefrom. One edge 13 of each enclosure is provided with an outwardly inclined extremity 15 which tends to deflect heat away from the windshield wiper blade B.

A liner 16 of insulating material covers the major portion of the inner surface of each enclosure and acts to insulate the outer enclosing portion from heat and from the electrical current passing through the heating element.

A series of supports 17 extend between the sides 12 and 13 of the enclosures 10 and 11 to support the heating element. The supports 17 are shown as including a relatively large diameter intermediate portion 19 which act as a spacer between the sides of the enclosure and which are made of material nonconductive of electricity. A relatively small diameter end portion 20 is provided at each end of the larger diameter center portion 19 of these spacers and these smaller diameter end portions extend through suitable apertures such as 28 in the sides 12 and 13 of the enclosures 10 and 11.

A heating element 21 extends longitudinally through each enclosure between the base portion 14 thereof and the spacers 17. Thus, the heating element is confined in the upper portion of each enclosure. As shown in Figure 2 of the drawings the ends of the heating element 21 may extend through suitable insulation sleeves 22 and are supported thereby. The ends of the two heating elements are connected by an insulated conductor 23.

The outer side wall 12 of each of the enclosures is provided with an arcuate extension 25. Inwardly extending ears 26 on the outer arcuate walls 25 of one of the enclosures are arranged in overlapping relation with outwardly extending ears 27 on the arcuate extension 24 of the inner side wall 13 and a pivot 29 extends through the ears 26 and 27 to pivotally connect the two enclosures.

Spring fingers 31 are provided on the inner wall 13 of the enclosure 10 and similar spring fingers 32 are provided on the inner wall 13 of the other enclosure 11. These spring fingers extend inwardly from the inner walls 13 in such a manner as to engage against the sides of the windshield wiper B and to hold the heater A in proper position relative to the windshield wiper blade.

A link 33 is hingedly connected at 34 to the base portion 14 of the enclosure 11 and this link is slotted as indicated at 35 to engage a pin 36 projecting upwardly from the base portion 14 of the other enclosure 10. When the link 34 is in the position shown in Figure 1 of the drawings the enclosures 10 and 11 are latched in parallel relation on opposite sides of the windshield wiper blade and are frictionally supported thereto by the springs 31 and 32.

Conductors 37 are connected to the ends of the heating elements 21 and are connected to a suitable source of current supply. When thus connected the heating elements generate heat which is directed toward the windshield. Spaced openings 39 are provided in the outer sides 12 of each of the enclosures 10 and 11 and through the insulation liners 16 within the enclosures so that excessive heat may be directed through the outer walls of the two enclosures, and toward the portions of the windshield outwardly of the device.

The operation of the device is believed obvious from the foregoing description. The two enclosures are pivoted apart and placed on opposite sides of the windshield wiper blade B. The enclosures are then swung together about the pivot 29 and the free ends of the enclosures are connected by the link 33. This link acts as a latch for holding the two enclosures in parallel relation. When in this position the spring fingers 31 and 32 engage against opposite sides of the windshield wiper blade and hold the device in place. When current is supplied to the heating elements, heat is generated within both enclosures and is directed toward the windshield. Excessive heat escapes through the apertures 39 and acts to heat areas of the windshield outwardly of the outer enclosure walls 12.

In accordance with the patent statues I have described the principles of construction and operation of my windshield wiper attachment and while I have endeavored to set forth the best embodiment thereof I desire to have it understood that obvious changes may be made within the scope of the following claims without departing from the spirit of my invention.

I claim:

1. A windshield wiper attachment including a pair of elongated channel shaped enclosures having open sides, hinge and locking means connecting said enclosures so that the open sides thereof may be positioned along the sides of a wiper blade adjacent to the surface of the windshield, said connecting means including a pivot to permit the enclosures to swing from a parallel relationship to a diverging relationship with respect to each other and a wiper blade, heating element means within said enclosures, resilient means on said enclosures resiliently engaging against a windshield wiper blade when said enclosures are in parallel relationship along said wiper blade.

2. A windshield wiper attachment including a pair of elongated enclosures which are substantially channel-shaped in cross section and provided with an open side, means pivotally connecting one end of each of said enclosures with the open side thereof directed in the same direction, said pivotal connecting means permitting said enclosures to pivot into or out of parallel relation, a heating element in each of said enclosures, and means for locking said enclosures in parallel relation to engage a windshield wiper blade therebetween.

3. The construction described in claim 2 and in which the inner sides of said enclosures are provided with outwardly diverging edges.

4. The construction described in claim 2 and in which the outer sides of said enclosures are provided with spaced apertures therethrough.

5. The construction described in claim 2 and including resilient fingers on said enclosures resiliently engaging opposite sides of a windshield wiper when said enclosures are in parallel relation.

6. The construction described in claim 2 and including spacers extending between opposite sides of each enclosure to hold the sides in spaced relation, said spacers confining said heating elements.

References Cited in the file of this patent

UNITED STATES PATENTS

| | | |
|---|---|---|
| 800,886 | Thompson | Oct. 3, 1905 |
| 1,235,257 | Thronson | July 21, 1917 |
| 1,640,887 | Davis | Aug. 30, 1927 |
| 1,845,465 | Wickstrom | Feb. 16, 1932 |